(12) United States Patent
Akkapeddi

(10) Patent No.: US 11,893,400 B1
(45) Date of Patent: Feb. 6, 2024

(54) SYSTEM AND METHOD FOR AUTOMATED ADJUSTMENT OF SOFTWARE APPLICATION FUNCTION INTEGRATIONS OF GRAPHICAL USER INTERFACE

(71) Applicant: BANK OF AMERICA CORPORATION, Charlotte, NC (US)

(72) Inventor: Naga Vamsi Krishna Akkapeddi, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 27 days.

(21) Appl. No.: 17/896,501

(22) Filed: Aug. 26, 2022

(51) Int. Cl.
  *G06F 9/451* (2018.01)
  *H04L 47/125* (2022.01)
  *H04L 47/70* (2022.01)
  *G06F 3/0481* (2022.01)

(52) U.S. Cl.
  CPC ............ *G06F 9/451* (2018.02); *H04L 47/125* (2013.01); *H04L 47/828* (2013.01); *G06F 3/0481* (2013.01)

(58) Field of Classification Search
  CPC ................................ G06F 3/0481; G06F 9/451
  See application file for complete search history.

(56) References Cited

U.S. PATENT DOCUMENTS

| | | | |
|---|---|---|---|
| 9,461,972 B1 * | 10/2016 | Mehta | H04L 63/0435 |
| 9,476,606 B2 | 10/2016 | Fadell et al. | |
| 9,921,716 B2 | 3/2018 | Hill et al. | |
| 10,084,642 B2 | 9/2018 | Goldfarb et al. | |
| 10,133,812 B2 | 11/2018 | Lee et al. | |
| 10,237,256 B1 | 3/2019 | Pena et al. | |
| 10,331,174 B2 | 6/2019 | Dreessen et al. | |
| 10,409,862 B2 | 9/2019 | Maharajh et al. | |
| 10,423,709 B1 | 9/2019 | Jones et al. | |
| 10,528,021 B2 | 1/2020 | Cahalane et al. | |
| 10,621,280 B2 | 4/2020 | Jain et al. | |
| 10,740,121 B2 | 8/2020 | Kaltenmaier et al. | |
| 10,909,168 B2 | 2/2021 | Reicher et al. | |
| 11,269,498 B2 * | 3/2022 | Barak | G06F 9/451 |
| 11,393,007 B2 | 7/2022 | Rose et al. | |
| 2016/0244011 A1 | 8/2016 | Ricci | |
| 2016/0359957 A1 | 12/2016 | Laliberte | |
| 2017/0142140 A1 | 5/2017 | Muddu et al. | |
| 2017/0366416 A1 | 12/2017 | Beecham et al. | |
| 2018/0364894 A1 | 12/2018 | Vainio et al. | |
| 2019/0018975 A1 | 1/2019 | Goldfarb et al. | |

(Continued)

*Primary Examiner* — Mong-Shune Chung
(74) *Attorney, Agent, or Firm* — Moore & Van Allen PLLC; Nicholas C. Russell

(57) ABSTRACT

Systems, computer program products, and methods are described herein automated adjustment of software application function integrations. The present invention is configured to continuously monitor user activity on a device application, determine one or more integrations of the device application as requiring data persistence, determine, via a machine learning engine, one or more frequently utilized integrations of the device application based on the user activity, generate an automated suggestion to add or remove at least one of the one or more integrations of the device application, receive a response indicating that the user would like to remove the at least one of the one or more integrations of the device application, and generate a secure call to a source application of the at least one of the one or more integrations to alter the data load associated with the integration.

20 Claims, 5 Drawing Sheets

(56) References Cited

U.S. PATENT DOCUMENTS

| | | |
|---|---|---|
| 2019/0155468 A1 | 5/2019 | Huang et al. |
| 2019/0392345 A1* | 12/2019 | Adaska .................... G06N 5/04 |
| 2020/0264918 A1* | 8/2020 | Bai ....................... G06F 1/3234 |
| 2022/0043964 A1* | 2/2022 | Stenerson .............. G06N 20/00 |

* cited by examiner

SYSTEM AND METHOD FOR AUTOMATED ADJUSTMENT OF SOFTWARE APPLICATION FUNCTION INTEGRATIONS OF GRAPHICAL USER INTERFACE

FIELD OF THE INVENTION

The present invention embraces a system for automated adjustment of software application function integrations.

BACKGROUND

Applications, irrespective of channel or mode (e.g., desktop, mobile, tab, VR device, or the like), are being designed and used with many integrations to support various user interactions. Over a period, some of the features or fields where real-time integrations are in place may be observed as not being used or utilized by certain users, and therefore utilizing system or network resources in an inefficient manner. There is a need for a system which automates the adjustment of such integrations based on actual observed use or perceived user interaction requirements.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

The present invention addresses the above needs by providing an intelligent system for automated adjustment of software application function integrations. The system described herein constantly monitors and identifies user behaviors with regard to applications and the features and fields integrated within such applications. User behavior is monitored using artificial intelligence (AI) and machine learning (ML) in order to gain a comprehensive understanding of user needs in an automated and efficient manner. The system also includes determining which integrations are real-time integrations and which are not, based on user interactions using AI/ML data. Furthermore, the invention may include determining what features and fields are less commonly used or more commonly used based on historical data of user interactions with one or more applications, or vice versa, based on user interactions. The system may determine what data and integrations demand real-time integration and data persistence at a client device or interface and may intelligently adjust the provision of real-time integrations and data persistence based on user need. The adjustment process flow may consist of sending a suggestion to the user based on system determinations. If there is no response, based on specific time limit, the system may automate a decision regarding resource usage or application function integration. In situations where an integration is required or removed, the system may send a secure call to source applications based on change of need. In other embodiments, based on response from source systems, the system may automate decisions on integration needs as well as data persistence, as well as simultaneously convert the data loads from near real time to batch, or vice versa.

Typically the system comprises: at least one memory device with computer-readable program code stored thereon; at least one communication device; at least one processing device operatively coupled to the at least one memory device and the at least one communication device, wherein executing the computer-readable code is configured to cause the at least one processing device to: continuously monitor user activity on a device application; determine one or more integrations of the device application as requiring data persistence; determine, via a machine learning engine, one or more frequently utilized integrations of the device application based on the user activity; generate an automated suggestion to add or remove at least one of the one or more integrations of the device application; receive a response indicating that the user would like to remove the at least one of the one or more integrations of the device application; and generate a secure call to a source application of the at least one of the one or more integrations to alter the data load associated with the integration.

In some embodiments, the user activity comprises one or more interactions with a feature, field, or integration of the device application.

In other embodiments, altering the data load associated with the integration further comprises converting the data load from near real-time to batch when removing the at least one of the one or more integrations.

In still further embodiments, the at least one processor is further configured to receive a response indicating that the user would like to add the at least one of the one or more integrations of the device application.

In some embodiments, altering the data load associated with the integration further comprises converting the data load from batch to near real-time when adding the at least one of the one or more integrations.

In further embodiments, determining via the machine learning engine, one or more frequently utilized integrations of the device application based on the user activity further comprises analyzing an aggregate pool of user activity data from multiple users to determine one or more correlated integrations.

In some embodiments, the at least one processor is further configured to automatically remove the at least one of the one or more integrations of the device application after a set time period following generation of the automated suggestion.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
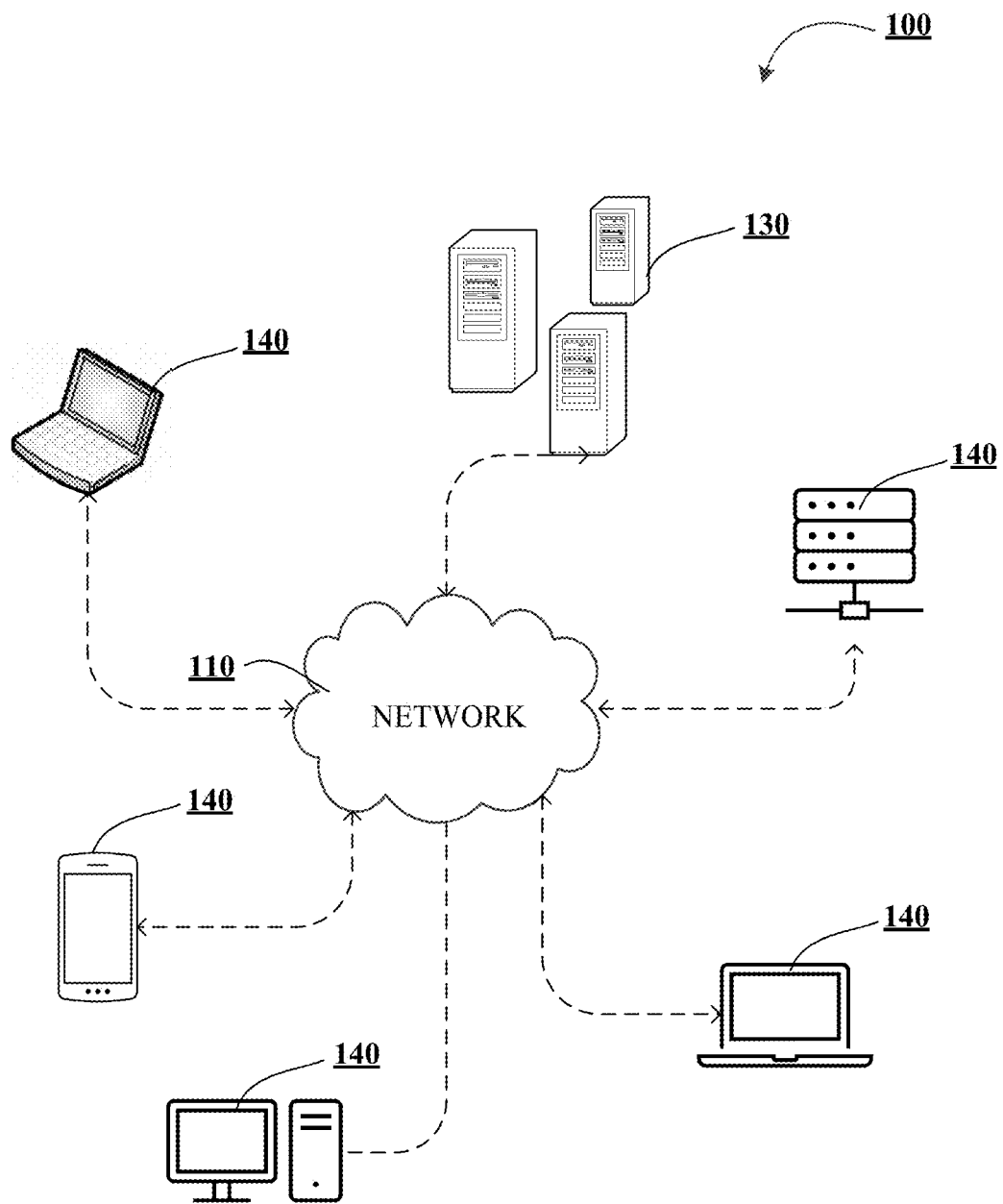
Figure 1B:
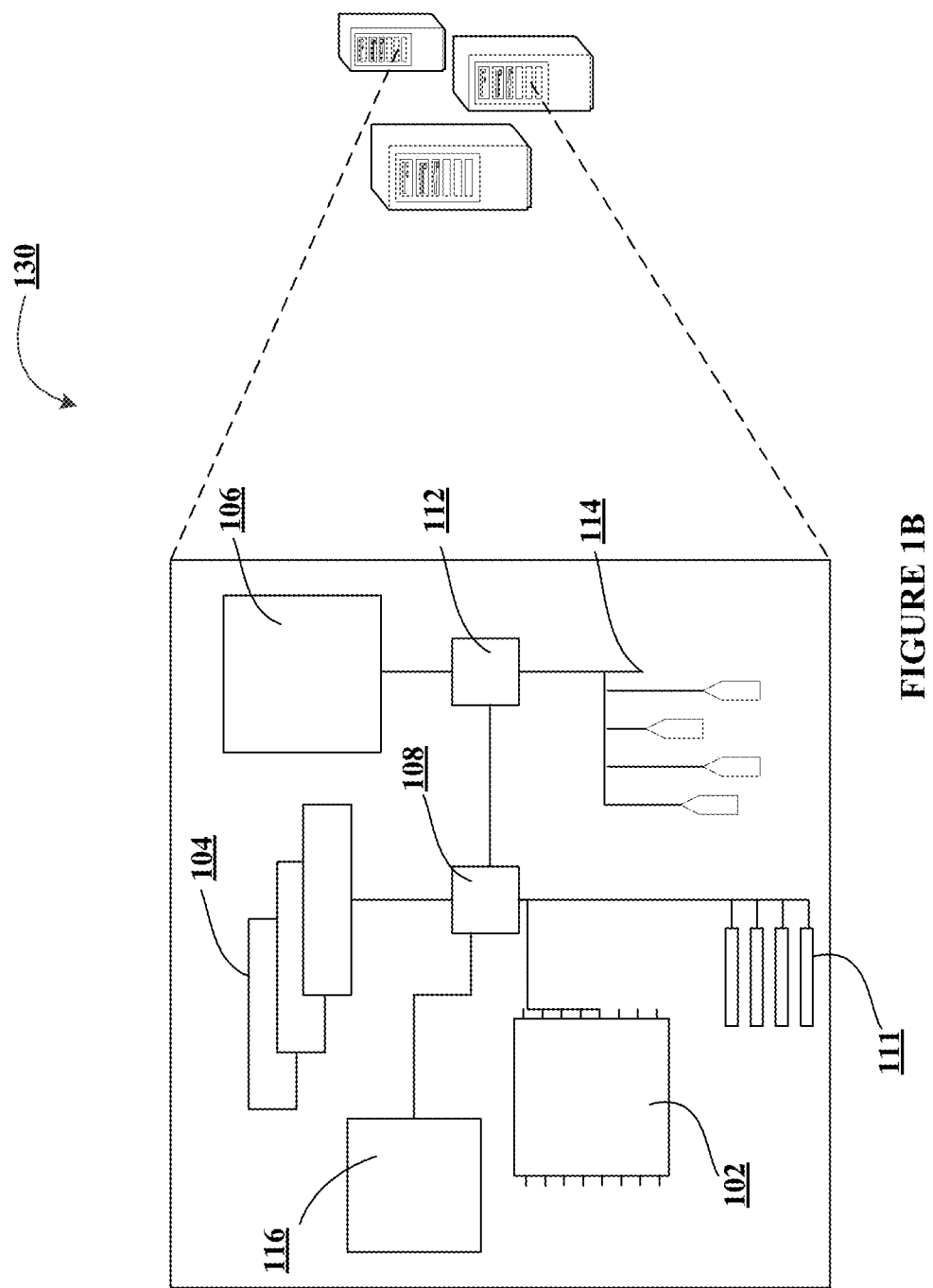
Figure 1C:
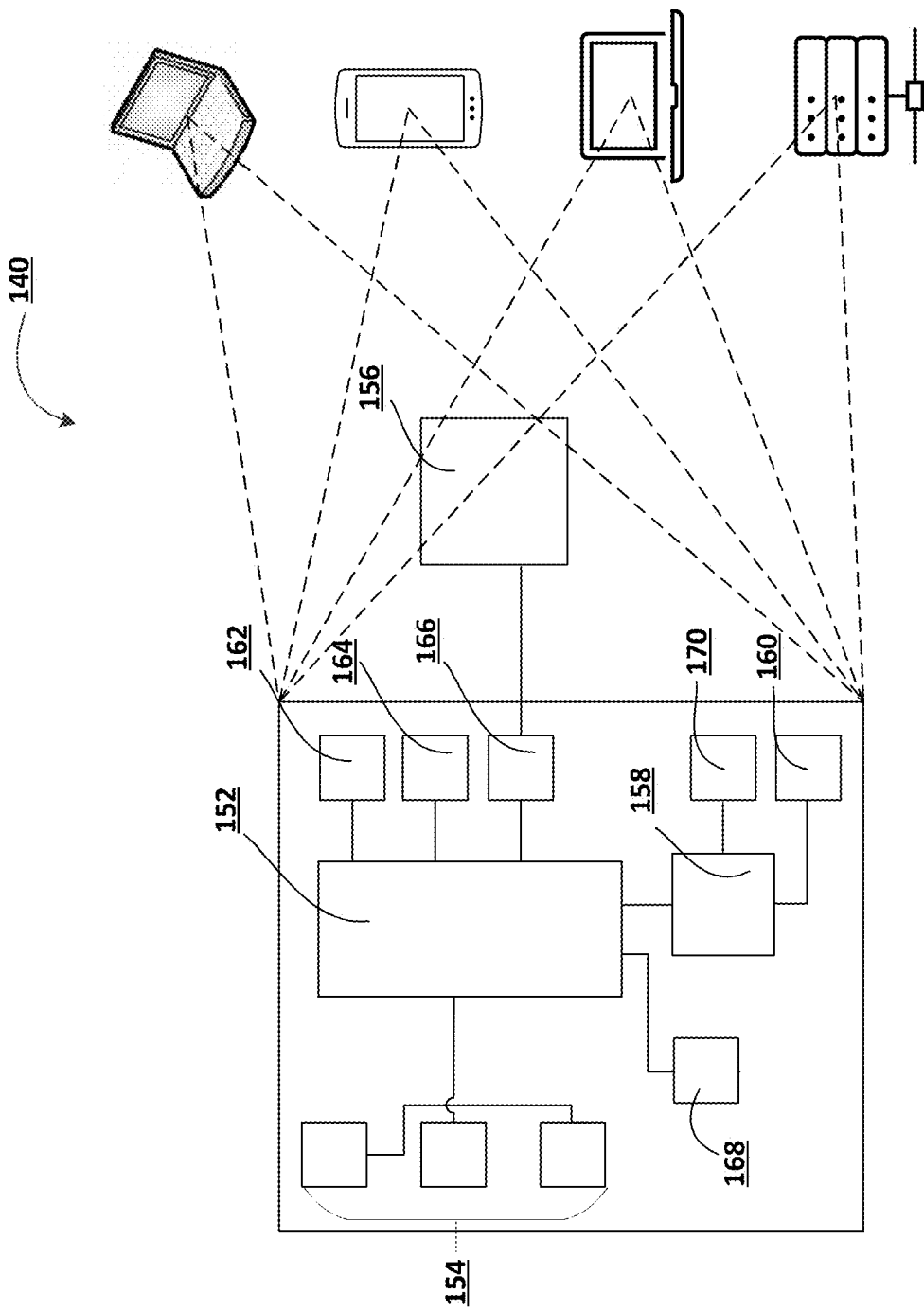
Figure 2:
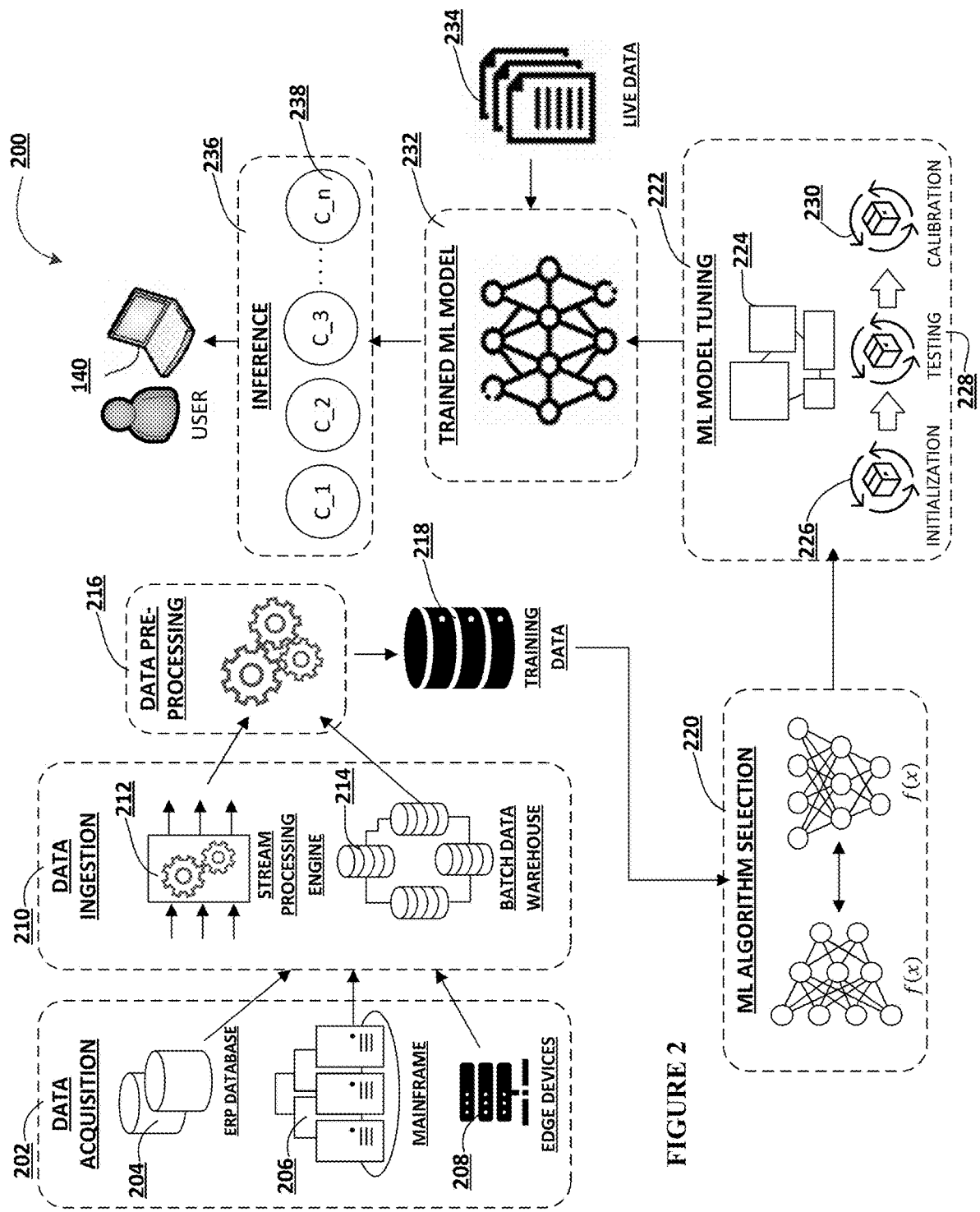
Figure 3:
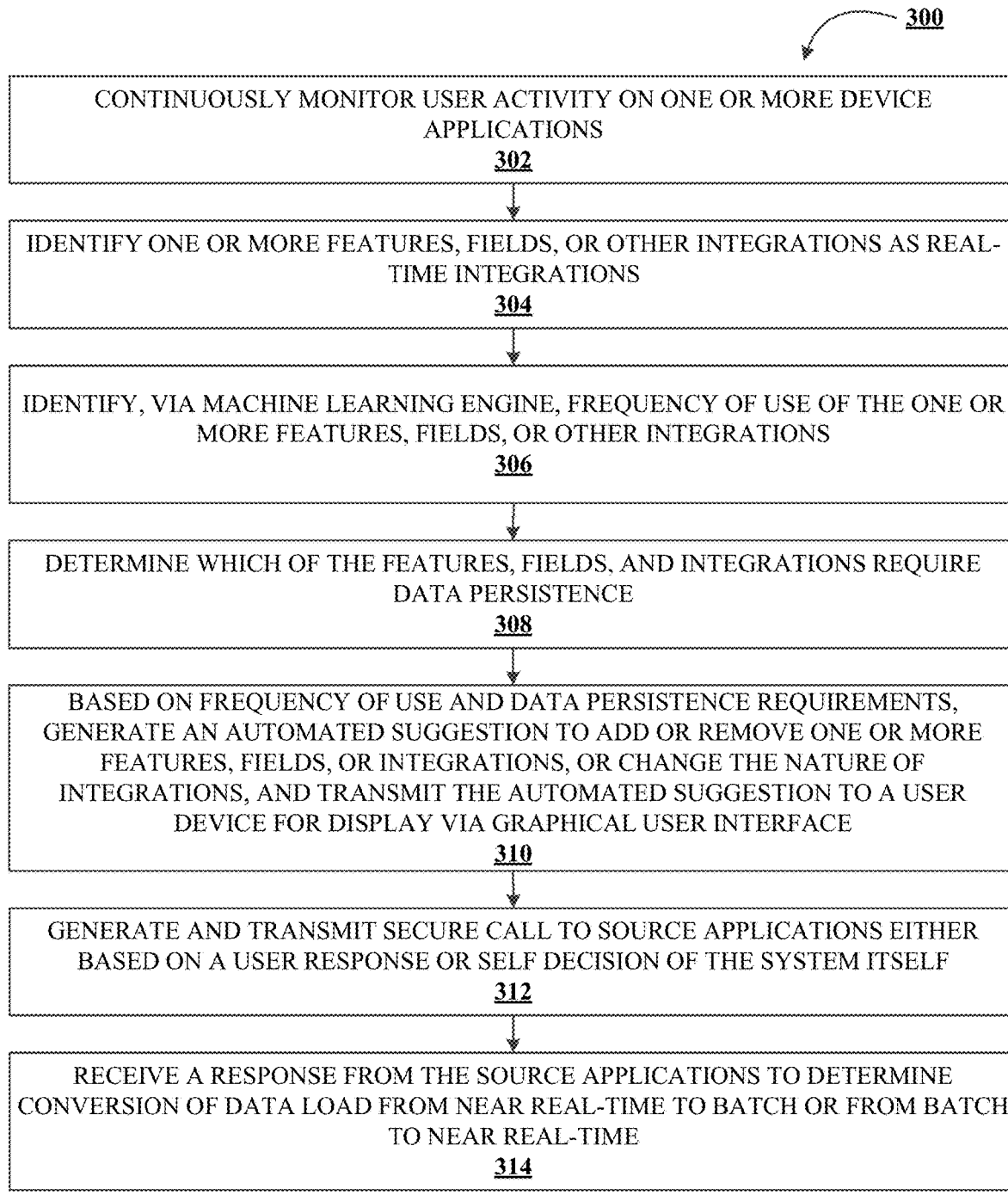

Having thus described embodiments of the invention in general terms, reference will now be made the accompanying drawings, wherein:

FIGS. 1A-1C illustrate technical components of an exemplary distributed computing environment for the system for automated adjustment of software application function integrations, in accordance with an embodiment of the invention;

FIG. 2 illustrates technical components of an exemplary machine learning environment for the system for automated adjustment of software application function integrations, in accordance with an embodiment of the invention; and FIG. 3 illustrates a process flow for the system for automated adjustment of software application function integrations in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Applications, irrespective of channel or mode (e.g., desktop, mobile, tab, VR device, or the like), are being designed and used with many integrations to support various user interactions. Over a period, some of the features or fields where real-time integrations are in place may be observed as not being used or utilized by certain users, and therefore utilizing system or network resources in an inefficient manner. There is a need for a system which automates the adjustment of such integrations based on actual observed use or perceived user interaction requirements.

The present invention addresses the above needs by providing an intelligent system for automated adjustment of software application function integrations. The system described herein constantly monitors and identifies user behaviors with regard to applications and the features and fields integrated within such applications. User behavior is monitored using artificial intelligence (AI) and machine learning (ML) in order to gain a comprehensive understanding of user needs in an automated and efficient manner. The system also includes determining which integrations are real-time integrations and which are not, based on user interactions using AI/ML data. Furthermore, the invention may include determining what features and fields are less commonly used or more commonly used based on historical data of user interactions with one or more applications, or vice versa, based on user interactions. The system may determine what data and integrations demand real-time integration and data persistence at a client device or interface and may intelligently adjust the provision of real-time integrations and data persistence based on user need. The adjustment process flow may consist of sending a suggestion to the user based on system determinations. If there is no response, based on specific time limit, the system may automate a decision regarding resource usage or application function integration. In situations where an integration is required or removed, the system may send a secure call to source applications based on change of need. In other embodiments, based on response from source systems, the system may automate decisions on integration needs as well as data persistence, as well as simultaneously convert the data loads from near real time to batch, or vice versa.

What is more, the present invention provides a technical solution to a technical problem. As described herein, the technical problem includes general inefficiency of application data persistence support with regard to various application integrations that may go unused. The technical solution presented herein allows for a dynamic way of identifying user-specific application needs, and responding to those needs in an automated fashion in order to convert certain unneeded application integration data loads from persistent data loads to batch data loads in order to save system resources and network capacity, as well as to streamline the user interface of the application itself. In particular, the system for automated adjustment of software application function integrations is an improvement over existing solutions to the problem of streamlining application integrations and optimizing application efficiency (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for automated adjustment of software application function integrations 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions.

The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C1, C\_2 \ldots C\_n$ 238) live data 234 based on how similar they are to one another to solve exploratory challenges where little is known about the data, provide a description or label (e.g., $C1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for the system for automated adjustment of software application function integrations in accordance with an embodiment of the invention. As shown in block 302, the process begins whereby the system continuously monitors user activity on one or more device applications of user device, which may be an end-point device 140. It is understood that the device applications may be one or more applications operating on the end-point device(s) 140, and in some embodiments, one or more applications operating on the system 130, such as in the case where the end-point device 140 is represented by a virtual machine environment, or the like. As further illustrated in block 304, the system may identify one or more features, fields, or other integrations of the one or more applications as real-time integrations. That is, the integration of the application may include a field or feature that draws data or sources information in real-time, or near real-time, from an external application or system. For example, the application of the user device may include one or more fields for data input, such as a text box, drop down menu, or the like. In some embodiments, the application may be related to a process for automation of the creation of an application programming interface (API), or the like. In such instances, the user may be presented, on a graphical user interface, with one or more options to request data, application services, or the like, from one or more external systems using the presented fields or features of the user application for API creation. The system may intelligently identify which features and fields of the application are real-time integrations, and therefore require relatively more system resources or network bandwidth in order to maintain and operate properly within the application interface.

Next, as shown in block 306, the system may identify, via the machine learning engine described in FIG. 2, the frequency of use of the one or more features, fields, or other integrations within the application interface of the user device. In this way, the system may track user activity over time as the user interacts with the application of the end-point device 140. The user may be authenticated prior to each session with the application. For example, each user may be assigned a user name, password, pin code, or other identifying credential associated with their unique identity. As such, the system may collect data as each user interacts with the application in order to track and identify which features, fields, and integrations within the application that the user utilizes. The system may compare the utilization of certain fields, features, and integrations with the overall use of all fields, features, and integrations in order to determine a statistical frequency of use of each field or feature of the application. In this way, the system may determine a ranking of most utilized features, fields, or the like, for each user. In other embodiments, the system may correlate certain features and fields with other related features and fields in order to intelligently predict which integrations the user may utilize in the future. In still further embodiments, the system may aggregate and compare data from multiple users in order to determine a statistical breakdown of which features, fields, and integrations are typically highly correlated.

The system proceeds by determining which of the features, fields, and integrations require data persistence, as shown in block 308. It is understood that the step of determining which features, fields, and integrations require data persistence is an automated function of the system via communication with the systems where the external applications reside. Based on frequency of use and data persistence requirements, the system may generate an automated suggestion to add or remove one or more features, fields, or integrations, and may transmit the automated suggestion to the end point device 140 for display via a graphical user interface, as shown in block 310. It is understood that the ML engine, in some embodiments, will initiate a self-decision. As such, sending a suggestion to the user may be a courtesy in some instances, but implementation of a change to a feature, field, or application integration should not be dependent on user approval alone. As such, the system may then generate and transmit a secure call to the source applications based on the user's response to the automated suggestion or based on a self-decision of the system itself via logic of the ML engine. In some instances, the user may not respond to the suggestion at all. In instances where the user is unresponsive, the system may "time-out" the opportunity for user input regarding implementation of the change to the feature, field, or integration (e.g., the suggestion may be displayed via the GUI for a period of five minutes before timing out and automating a self-decision to add or remove a feature, field, or integration, or the like). The user may opt to remove or keep the features, fields, or integrations that the system recommends or suggests removing or adding. Finally, the system may receive a response from the source applications to determine conversion of data load from near real-time to batch, if the removed integration requires data persistence, or from batch to near real-time if an added integration requires data persistence.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for automated adjustment of software application function integrations the system comprising:
at least one non-transitory storage device; and
at least one processor coupled to the at least one non-transitory storage device, wherein the at least one processor is configured to:
continuously monitor user activity on a device application;
determine one or more integrations of the device application as requiring data persistence;

determine, via a machine learning engine, one or more frequently utilized integrations of the device application based on the user activity;

generate an automated suggestion to add or remove at least one of the one or more integrations of the device application; and generate a secure call to a source application of the at least one of the one or more integrations to alter the data load associated with the integration.

2. The system of claim 1, wherein the at least one processor is further configured to receive a response indicating that the user would like to remove the at least one of the one or more integrations of the device application.

3. The system of claim 1, wherein altering the data load associated with the integration further comprises converting the data load from near real-time to batch when removing the at least one of the one or more integrations.

4. The system of claim 1, wherein the at least one processor is further configured to receive a response indicating that the user would like to add the at least one of the one or more integrations of the device application.

5. The system of claim 4, wherein altering the data load associated with the integration further comprises converting the data load from batch to near real-time when adding the at least one of the one or more integrations.

6. The system of claim 1, wherein determining via the machine learning engine, one or more frequently utilized integrations of the device application based on the user activity further comprises analyzing an aggregate pool of user activity data from multiple users to determine one or more correlated integrations.

7. The system of claim 1, wherein the at least one processor is further configured to automatically remove the at least one of the one or more integrations of the device application after a set time period following generation of the automated suggestion.

8. A computer program product for automated adjustment of software application function integrations the computer program product comprising a non-transitory computer-readable medium comprising code causing an apparatus to:

continuously monitor user activity on a device application;

determine one or more integrations of the device application as requiring data persistence;

determine, via a machine learning engine, one or more frequently utilized integrations of the device application based on the user activity;

generate an automated suggestion to add or remove at least one of the one or more integrations of the device application; and generate a secure call to a source application of the at least one of the one or more integrations to alter the data load associated with the integration.

9. The computer program product of claim 8, further configured to receive a response indicating that the user would like to remove the at least one of the one or more integrations of the device application.

10. The computer program product of claim 8, wherein altering the data load associated with the integration further comprises converting the data load from near real-time to batch when removing the at least one of the one or more integrations.

11. The computer program product of claim 8, further configured to receive a response indicating that the user would like to add the at least one of the one or more integrations of the device application.

12. The computer program product of claim 11, wherein altering the data load associated with the integration further comprises converting the data load from batch to near real-time when adding the at least one of the one or more integrations.

13. The computer program product of claim 8, wherein determining via the machine learning engine, one or more frequently utilized integrations of the device application based on the user activity further comprises analyzing an aggregate pool of user activity data from multiple users to determine one or more correlated integrations.

14. The computer program product of claim 8, wherein the at least one processor is further configured to automatically remove the at least one of the one or more integrations of the device application after a set time period following generation of the automated suggestion.

15. A method for automated adjustment of software application function integrations the method comprising:

continuously monitoring user activity on a device application;

determining one or more integrations of the device application as requiring data persistence;

determining, via a machine learning engine, one or more frequently utilized integrations of the device application based on the user activity;

generating an automated suggestion to add or remove at least one of the one or more integrations of the device application; and generating a secure call to a source application of the at least one of the one or more integrations to alter the data load associated with the integration.

16. The method of claim 15, further configured to receive a response indicating that the user would like to remove the at least one of the one or more integrations of the device application.

17. The method of claim 15, wherein altering the data load associated with the integration further comprises converting the data load from near real-time to batch when removing the at least one of the one or more integrations.

18. The method of claim 15, further configured to receive a response indicating that the user would like to add the at least one of the one or more integrations of the device application.

19. The method of claim 18, wherein altering the data load associated with the integration further comprises converting the data load from batch to near real-time when adding the at least one of the one or more integrations.

20. The method of claim 15, wherein determining via the machine learning engine, one or more frequently utilized integrations of the device application based on the user activity further comprises analyzing an aggregate pool of user activity data from multiple users to determine one or more correlated integrations.

* * * * *